(12) United States Patent
Jung et al.

(45) Date of Patent: *Jun. 29, 2021
(10) Patent No.: US 11,049,488 B2

(54) EV VEHICLE DRIVING SOUND CONTROL SYSTEM AND CONTROL METHOD

(71) Applicants: Hyundai Motor Company, Seoul (KR); Kia Motors Corporation, Seoul (KR)

(72) Inventors: In-Soo Jung, Suwon-si (KR); Dong-Chul Lee, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/674,960

(22) Filed: Nov. 5, 2019

(65) Prior Publication Data
US 2020/0184946 A1    Jun. 11, 2020

(30) Foreign Application Priority Data
Dec. 6, 2018 (KR) .................. 10-2018-0156340

(51) Int. Cl.
*G10K 15/02* (2006.01)
*B60C 5/00* (2006.01)

(52) U.S. Cl.
CPC .............. *G10K 15/02* (2013.01); *B60C 5/008* (2013.01); *B60L 2270/42* (2013.01); *B60Y 2306/11* (2013.01)

(58) Field of Classification Search
CPC ............ F02D 2200/501; F02D 41/042; F02N 11/0814; H04R 2499/13; Y02T 10/62
USPC ............................................. 381/86
See application file for complete search history.

(56) References Cited

U.S. PATENT DOCUMENTS

| 6,119,446 A * | 9/2000 | Shon ................... F02C 9/28 60/773 |
| 6,356,185 B1 | 3/2002 | Plugge et al. |
| 8,179,234 B1 | 5/2012 | Atwood |
| 10,065,561 B1 | 9/2018 | Bastyr et al. |

(Continued)

FOREIGN PATENT DOCUMENTS

| JP | 2011-235774 A | 11/2011 |
| KR | 10-0520547 B1 | 10/2005 |

(Continued)

*Primary Examiner* — George C Monikang
(74) *Attorney, Agent, or Firm* — Morgan, Lewis & Bockius LLP

(57) ABSTRACT

An EV driving sound control system may include a sound output device of generating a driving sound of an EV vehicle; a torque measurement sensor of measuring a torque of a motor in the EV vehicle; an indoor noise measurement sensor of detecting a noise of the EV vehicle; and a signal processing controller for controlling the sound output device to reach a target tone by receiving signals from the torque measurement sensor and the indoor noise measurement sensor, wherein the signal processing controller extracts and outputs only the acceleration feeling sound component from an engine sound upon acceleration, and masks high-frequency noise upon deceleration by the sound output device, by use of the traveling information related to the EV vehicle inputted from the CAN communication in real time and the signals inputted from the indoor noise measurement sensor and the torque measurement sensor.

16 Claims, 8 Drawing Sheets

(56) References Cited

U.S. PATENT DOCUMENTS

2002/0050252 A1* 5/2002 Moteki ................ F02B 75/045
                                                           123/48 B
2017/0001559 A1   1/2017 Kwon

FOREIGN PATENT DOCUMENTS

KR      10-1180805 B1    9/2012
KR      2017-0128938 A  11/2017

* cited by examiner

EV VEHICLE DRIVING SOUND CONTROL SYSTEM AND CONTROL METHOD

CROSS-REFERENCE TO RELATED APPLICATION

The present application claims priority to Korean Patent Application No. 10-2018-0156340, filed on Dec. 6, 2018, the entire contents of which is incorporated herein for all purposes by this reference.

BACKGROUND OF THE PRESENT INVENTION

Field of the Invention

The present invention relates to an EV driving sound control system and a control method, and more particularly, to an EV driving sound control system and a control method using a motor torque or a power performance change value of an EV vehicle.

Description of Related Art

Today, vehicle technology has come to apply a drive motor instead of an internal combustion engine as a power source.

Since an EV vehicle accelerates by use of the motor, unlike the engine torque curve of the internal combustion engine, powerful torque is poured from the beginning of acceleration.

In some EV vehicles, early acceleration is superior to that of a high displacement internal combustion engine vehicle.

The EV vehicle is very quiet compared to the internal combustion engine, compared to superior acceleration feeling.

This is because it is impossible for the EV vehicle to obtain an exciting engine sound like the internal combustion engine from a motor due to its characteristics.

Furthermore, the conventional EV vehicle has been developed according to the characteristics of an electric vehicle (EV), focusing on quietness.

However, there is the trend that vehicle drivers today require both dynamic and quietness.

Therefore, the vehicle makers also have various driving modes such as a comfort mode and a sports mode separately in one vehicle.

Since the history of the internal combustion engine vehicle is longer than the EV vehicle history, drivers have become accustomed to the internal combustion engine.

Therefore, for the driver to sufficiently feel the sense of acceleration, not only the speed but also the engine tone corresponding thereto is required.

To meet such a demand, the conventional EV vehicle simply stores a virtual engine tone and then lets the driver hear it through the speaker.

However, in such a manner, there is a limit to feel the sense of acceleration like the internal combustion engine vehicle because the driver hears an artificial sound which is not a natural engine tone corresponding to the internal combustion engine.

Furthermore, regenerative braking is applied to the EV vehicle upon deceleration, and at the present time, a high frequency noise is generated.

This may be removed because it makes the driver feel uncomfortable.

However, there has been a problem that the conventional EV vehicle is left without removing such high-frequency noise.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an EV driving sound control system and a control method.

The present invention includes an EV driving sound control system including a sound output device configured for generating a driving sound of an EV vehicle; a torque measurement sensor of measuring a torque of a motor in the EV vehicle; an indoor noise measurement sensor of detecting a noise of the EV vehicle; and a signal processing controller for controlling the sound output device to reach a target tone by receiving signals from the torque measurement sensor and the indoor noise measurement sensor, and the signal processing controller extracts and outputs only the acceleration feeling sound component from an engine sound when a power performance of an engine vehicle matching with a power performance of the EV vehicle is implemented upon acceleration, and masks high-frequency noise upon deceleration by the sound output device, by use of the traveling information related to the EV vehicle inputted from the CAN communication in real time and the signals inputted from the indoor noise measurement sensor and the torque measurement sensor.

Furthermore, whether the EV vehicle is accelerated is determined by whether the motor torque change is determined as positive from the torque measurement sensor.

Furthermore, the motor torque is subject to smoothing in real time.

Furthermore, the acceleration feeling sound component is extracted from an engine order arrangement arranged based on the RPM of the motor.

Furthermore, the acceleration feeling sound component is provided through an indoor speaker.

Furthermore, the acceleration feeling sound component applies a variable bandwidth filter proportional to the RPM of the motor.

Furthermore, the acceleration feeling sound component to which the variable bandwidth filter is applied has an indoor tone subject to a PID control by the indoor noise measurement sensor mounted in the indoor thereof.

Furthermore, the acceleration feeling sound component to which the variable bandwidth filter is applied has an indoor tone subject to a PID control by an outdoor noise measurement sensor mounted in the outdoor thereof.

Furthermore, the outdoor is an engine compartment.

Furthermore, whether the EV vehicle is decelerated is determined by whether the motor torque change is determined as negative from the torque measurement sensor.

Furthermore, the motor torque is subject to smoothing in real time.

Furthermore, the masking the high-frequency noise extracts a component required for masking upon deceleration from the RPM of the motor and the negative motor torque.

Furthermore, the component required for masking is an order arrangement from the RPM of the motor and a level of the torque in the motor.

Furthermore, the level of the motor torque is converted into positive by applying an absolute value to a negative value.

Furthermore, the present invention includes an EV driving sound control system including a sound output device configured for generating a reinforcing sound to reinforce a driving sound of an EV vehicle; a power change amount measurement sensor of measuring a power change signal of the EV vehicle in real time; and a signal processing controller for controlling the sound output device by applying a variable frequency band filter upon acceleration of the EV vehicle, and performing a high-frequency noise masking control upon deceleration of the EV vehicle, by use of the traveling information related to the EV vehicle inputted from the CAN communication in real time and the signals inputted from the indoor noise measurement sensor and the power change amount measurement sensor.

Furthermore, the EV driving sound control system further includes an indoor noise measurement sensor of detecting the indoor noise of the EV vehicle.

Furthermore, the frequency band of the variable frequency band filter is set in proportion to the RPM of the motor.

Furthermore, the traveling information includes at least any one among the RPM of the motor, the pedal opening amount, the vehicle speed, the traveling mode, and the gear position.

Furthermore, the signal processing controller is configured to select the engine order arrangement corresponding to an internal combustion engine from the RPM of the motor.

Furthermore, the signal processing controller sets a level in the engine order arrangement by use of the RPM of the motor.

Furthermore, various aspects of the present invention provide an EV vehicle driving sound control method including applying a variable frequency band filter upon acceleration of an EV vehicle and performing a high-frequency noise masking control upon deceleration of the EV vehicle by operating any one or more among the torque and the RPM of the motor of the EV vehicle, the pedal opening amount, the vehicle speed, the traveling mode, and the gear position in a signal processing controller.

Furthermore, the EV vehicle driving sound control method further includes an indoor noise measurement sensor of detecting the indoor noise of the EV vehicle.

Furthermore, the frequency band of the variable frequency band filter is set in proportion to the RPM of the motor.

Furthermore, the high-frequency noise masking control applies an absolute value to the motor torque value.

Furthermore, the signal processing controller is configured to select the engine order arrangement corresponding to an internal combustion engine from the RPM of the motor.

Furthermore, the signal processing controller sets a level in the engine order arrangement by use of the RPM of the motor.

Furthermore, various aspects of the present invention provide an EV vehicle driving sound control method including applying a variable frequency band filter upon acceleration of an EV vehicle and performing a high-frequency noise masking control upon deceleration of the EV vehicle by operating any one or more among the real-time power change amount of the EV vehicle, the RPM of the motor, the pedal opening amount, the vehicle speed, the traveling mode, and the gear position in a signal processing controller.

Furthermore, the vehicle speed is applied to differential control logic upon constant-speed traveling of the EV vehicle.

According to an exemplary embodiment of the present invention, the following effects may be obtained.

Firstly, it is possible to perform an engine tone control similar to that of the internal combustion engine by reinforcing the acceleration feeling by use of the torque value or the power characteristic change of the motor, which is the power source of the EV vehicle in real time, providing the sense of acceleration similar to that of the internal combustion engine vehicle.

Secondly, it is possible to perform a masking processing for the high frequency noise generated upon deceleration of the EV vehicle, offsetting the heterogeneity of the EV vehicle.

Thirdly, it is possible to use the motor torque of the EV vehicle as the reference level, and include the indoor noise measurement sensor of detecting the indoor noise of the EV vehicle, realizing the natural engine tone which is closer to reality through the PID control.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
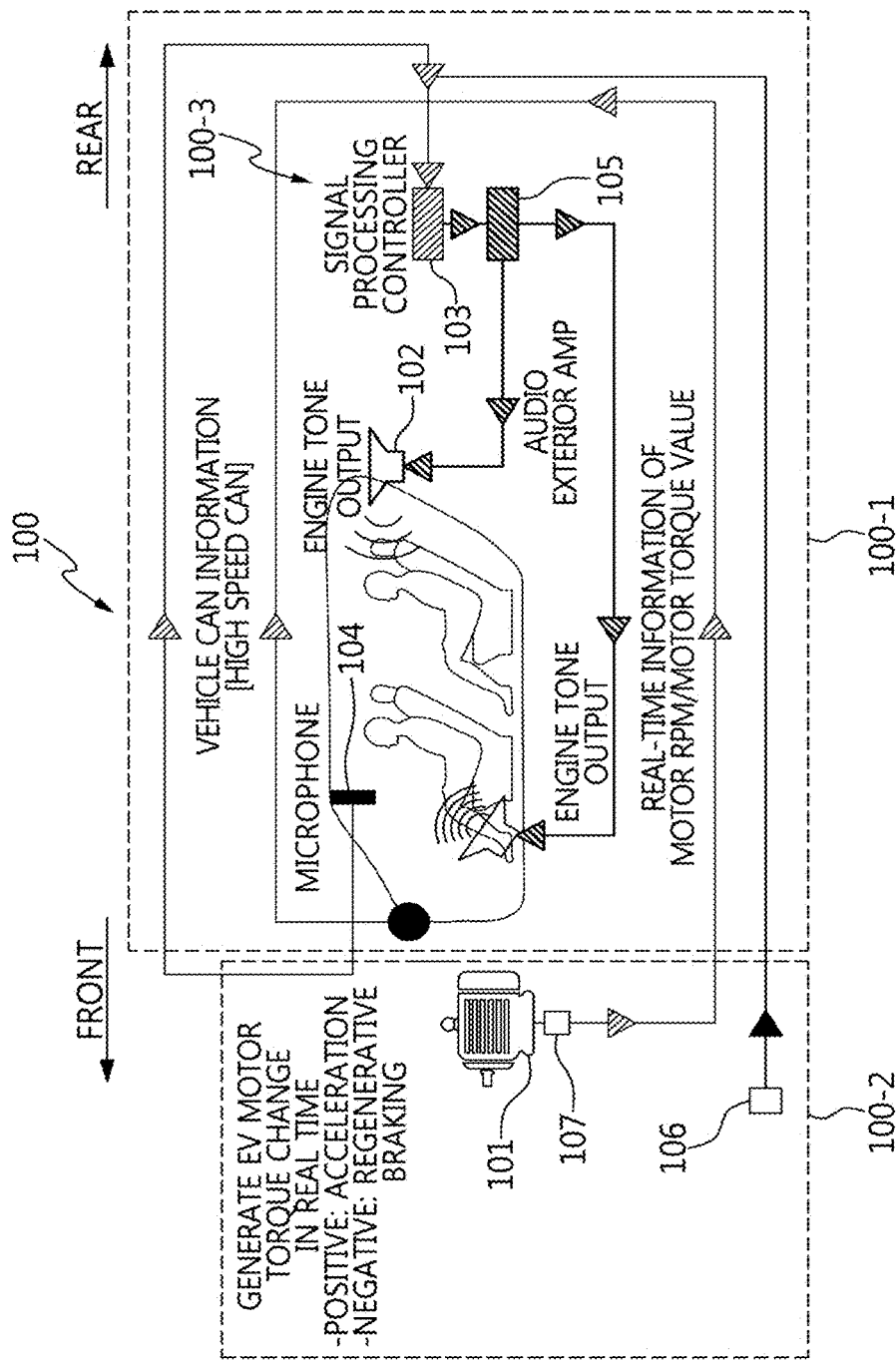
FIG. 1 is a conceptual diagram according to a first exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals are used for like elements in describing each drawing.

The terms "first," "second," and the like may be used to illustrate different components, but the components may not be limited by the terms. The terms are used to differentiate one element from another.

For example, a first component may be referred to as a second component, and similarly, the second component may be also referred to as the first component without departing from the scope of the present invention. The terms "and/or" includes combination of a plurality of related listed items or any of a plurality of related listed items.

Unless otherwise defined, all terms including technical and scientific terms used herein have the same meaning as commonly understood by one of ordinary skill in the art to which an exemplary embodiment of the present invention belongs.

It will be further understood that terms, such as those defined in commonly used dictionaries, may be additionally interpreted as having a meaning that is consistent with their meaning in the context of the relevant art, and will not be interpreted in an idealized or overly formal sense unless so defined in the application.

Referring to FIG. 1, an EV (Electric Vehicle) vehicle 100 includes an EV driving sound control system 100-3 at a passenger boarding room 100-1. The EV driving sound control system 100-3 includes a motor 101, a sound output device 102, a signal processing controller 103, an indoor noise measurement sensor 104, a proportional-integral-differential (PID) controller 105, an outdoor noise measurement sensor 106 and a torque measurement sensor 107.

The EV vehicle 100 forms an engine compartment 100-2 in front of the passenger boarding room 100-1 and a trunk compartment in rear of the passenger boarding room 100-1.

In the instant case, the passenger boarding room 100-1 provides a place where is located the sound output device 102, the signal processing controller 103, the indoor noise measurement sensor 104, the PID controller 105 and the engine compartment 100-2 provides a place where is located the motor 101, the outdoor noise measurement sensor 106 and the torque measurement sensor 107. However a component of the EV driving sound control system 100-3 may be appropriately installed in any one of the passenger boarding room 100-1 and the engine compartment 100-2.

A sound output device 102 generates a reinforcing sound to reinforce the driving sound of an EV vehicle 100. The sound output device 102 connects the signal processing controller 103 or the PID controller 105.

A torque measurement sensor 107 measures a torque signal of a torque signal unit 110 of a motor 101 of the EV vehicle 100 in real time. (See FIG. 3.) However the torque measurement sensor 107 is converted to a power change amount measurement sensor 110-1 to measure a power change amount of a motor 101 of the EV vehicle 100 in real time. (See FIG. 5.)

An indoor noise measurement sensor 104 is used for setting a PID control to detect the indoor noise of the EV vehicle 100 to correspond to the engine tone which is reinforced upon acceleration traveling of the vehicle.

A signal processing controller 103 controls the sound output device 102 or the PID controller 105 upon acceleration, deceleration, or constant-speed traveling of the EV vehicle 100.

The signal processing controller 103 receives the signals from the torque measurement sensor 107, the outdoor noise measurement sensor 106 and the indoor noise measurement sensor 104 to control the sound output device to reach a target tone. The signal processing controller 103 controls the sound output device 102 by use of the traveling information related to the EV vehicle 100 input from CAN (Controller Area Network) communication in real time and the signals input from the indoor noise measurement sensor 104 and the outdoor noise measurement sensor 106.

The signal processing controller 103 extracts and outputs only the acceleration feeling sound component from the engine sound when the power performance of the engine vehicle that matches the power performance with the EV vehicle 100 is implemented upon acceleration of the EV vehicle 100.

That is, the signal processing controller 103 matches and outputs the acceleration sound corresponding to a general internal combustion engine upon acceleration of the EV vehicle 100.

The signal processing controller 103 may preferably apply a variable frequency band filter 223 (or a variable bandwidth filter) upon acceleration of the EV vehicle 100. (See FIG. 4 and FIG. 6.)

Meanwhile, whether the EV vehicle 100 is accelerated is performed by whether the torque change of the motor 101 is determined as positive in the torque measurement sensor.

That is, when the torque change of the motor 101 is positive, it may be determined that the EV vehicle 100 is in an acceleration state.

The torque of the motor 101 at the instant time may preferably be smoothed in real time. In the instant case, smoothing procedure refers to a method of eliminating low-importance parts of torque.

Meanwhile, the acceleration feeling sound component may be extracted from an engine order arrangement arranged based on the RPM of the motor 101.

Furthermore, the acceleration feeling sound component may preferably apply a variable frequency band filter 223 (or a variable bandwidth filter which is proportional to the RPM of the motor 101.

Accordingly, the acceleration feeling sound component to which the variable frequency band filter 223 is applied may also have preferably the indoor tone subject to a PID control of the PID controller 105 by the indoor noise measurement sensor mounted inside the EV vehicle 100.

Meanwhile, the acceleration feeling sound component to which the variable frequency band filter 223 is applied may also have preferably the indoor tone subject to a PID control of the PID controller 105 by an outdoor noise measurement sensor 106 mounted outside the EV vehicle 100.

In the instant case, the outdoor may be the engine compartment 100-2 of the EV vehicle 100 and the indoor may be the passenger boarding room 100-1 of the EV vehicle 100.

The traveling information at the instant time may preferably include at least one among the RPM (Revolution per Minute) of the motor 101, the pedal opening amount, the vehicle speed, the traveling mode, and the gear position.

The frequency band of the variable frequency band filter 223 may preferably be set in proportion to the RPM of the motor 101 of the EV vehicle 100.

That is, it may be preferable to use a narrow frequency band in a region where the RPM of the motor 101 of the EV vehicle 100 is low, and conversely, to apply a wide frequency band in a region where the RPM thereof is high.

To increase the acceleration feeling of the EV vehicle 100, the engine tone is controlled by applying the torque value of the motor in real time after generating the order frequency based on the RPM of the motor.

That is, the engine order arrangement matching the segment of the vehicle is selected based on the RPM of the motor 101 of the EV vehicle 100. In the instant case, the segment of the vehicle means a vehicle grade classification such as small, medium, or large.

For example, when the EV vehicle 100 is a medium segment, the second order component, the fourth order component, and the sixth order component may be used.

Meanwhile, when the EV vehicle 100 is a large segment, the third order component, the fourth order component, the sixth order component, and the ninth order component may be used.

As described above, the level is set to each order arrangement by use of the torque value of the motor as a reference level in the order arrangement selected based on the RPM of the motor 101 extracted in real time. The engine tone control in the acceleration condition of the EV vehicle 100 may use the arrangement of summing the Integer order component and the Non-integer order component.

The Integer order component means a fundamental frequency Harmonic component by the number of engine cylinders.

For example, in the case of a six-cylinder internal combustion engine, the third order component, the sixth order component, and the ninth order component become the Integer order component, and the fourth order component and the eighth order component become the Non-integer order component.

Upon acceleration of the EV vehicle 100, it is possible to add the Non-integer order component lower than the Integer order level after implementing a basic acceleration tone through Integer tone reinforcement, performing the engine tone control of the acceleration condition.

Conversely, upon deceleration of the EV vehicle 100, a high frequency noise masking control may be performed. In the instant case, a noise (or sound) masking is the addition of natural or artificial sound (commonly, though inaccurately, referred to as "white noise" or "pink noise") into an environment to cover-up unwanted sound by use of auditory masking.

At the present time, whether the EV vehicle 100 is decelerated is determined by whether the torque change of the motor 101 is determined as negative in the torque measurement sensor.

The torque of the motor 101 upon deceleration of the EV vehicle 100 may preferably be smoothed in real time.

Upon deceleration of the EV vehicle 100, high-frequency fine noise is generated upon the regenerative braking, and it may be suppressed by the high-frequency noise masking control.

The masking the high-frequency noise is an operation of extracting the component required for masking upon deceleration from the RPM of the motor 101 and the negative motor torque thereof.

In the instant case, the component required for masking may preferably be the order arrangement from the RPM of the motor 101 and the level of the motor torque thereof.

Meanwhile, the level of the motor torque at the instant time may preferably be converted into a positive value by applying an absolute value to a negative value.

The high-frequency noise masking control utilizes the Integer order component, and is controlled by a method for reducing the level of the order component in the frequency reduction direction occurring upon deceleration of the vehicle.

That is, the high frequency noise masking control may preferably apply the absolute value to the torque value of the motor 101.

Meanwhile, the order frequency determination based on the RPM of the motor 101 of the EV vehicle 100 is obtained by the following equation.

$$\text{Fundamental frequency} = \frac{\text{RPM of motor}}{60} \times \frac{N}{2}$$

(at the present time, N is the number of cylinders).

Meanwhile, the $n^{th}$ order component frequency is obtained by multiplying the Fundamental frequency value by n.

The signal processing controller 103 may preferably select an engine order arrangement corresponding to the internal combustion engine from the RPM of the motor 101.

Meanwhile, the signal processing controller 103 may preferably set the level in the engine order arrangement by use of the RPM of the motor 101.

Next, a driving sound control method of the EV vehicle 100 according to an exemplary embodiment of the present invention will be described.

Figure 2:
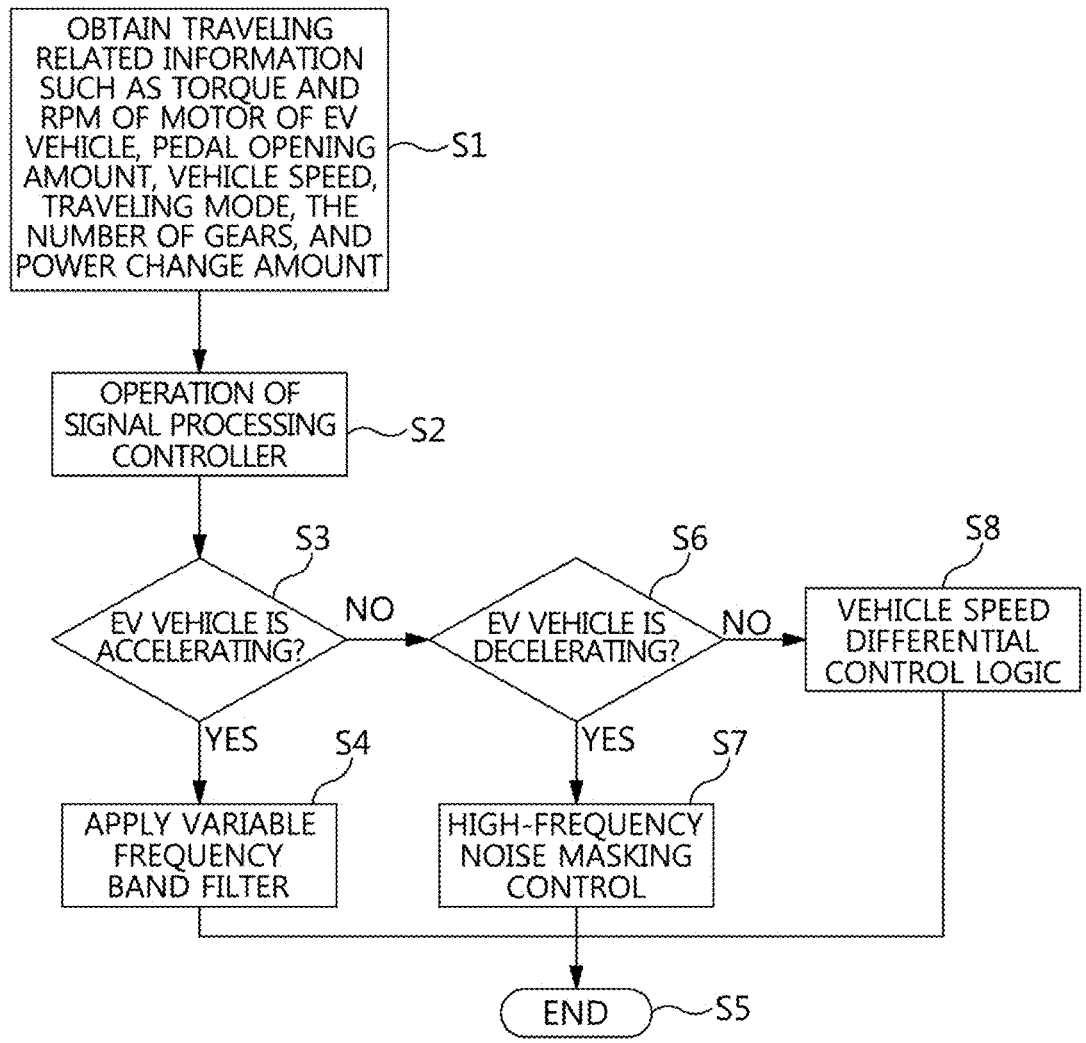
FIG. 2 is a flowchart of a driving sound control method of an EV vehicle according to an exemplary embodiment of the present invention.

FIG. 2 is a flowchart of a driving sound control method of the EV vehicle 100 according to an exemplary embodiment of the present invention.

The signal processing controller 103 obtains any one or more among the real time power change amount, the RPM of the motor 101 of the EV vehicle 100, the pedal opening amount, the vehicle speed, the traveling mode, and the gear position S1 and operates them S2.

It is determined whether the EV vehicle 100 is accelerating S3, and upon acceleration of the EV vehicle 100, a variable frequency band filter is applied S4.

It is determined whether the EV vehicle 100 is accelerating S3, and upon non-acceleration of the EV vehicle 100, it is determined whether the EV vehicle is decelerating S6.

Upon deceleration of the EV vehicle 100, the high-frequency noise masking control is performed S7.

Meanwhile, it is determined whether the EV vehicle 100 is decelerating S6 and upon constant-speed traveling of the EV vehicle 100 rather than non-deceleration, the vehicle speed is applied to the differential control logic S8.

Figure 3:
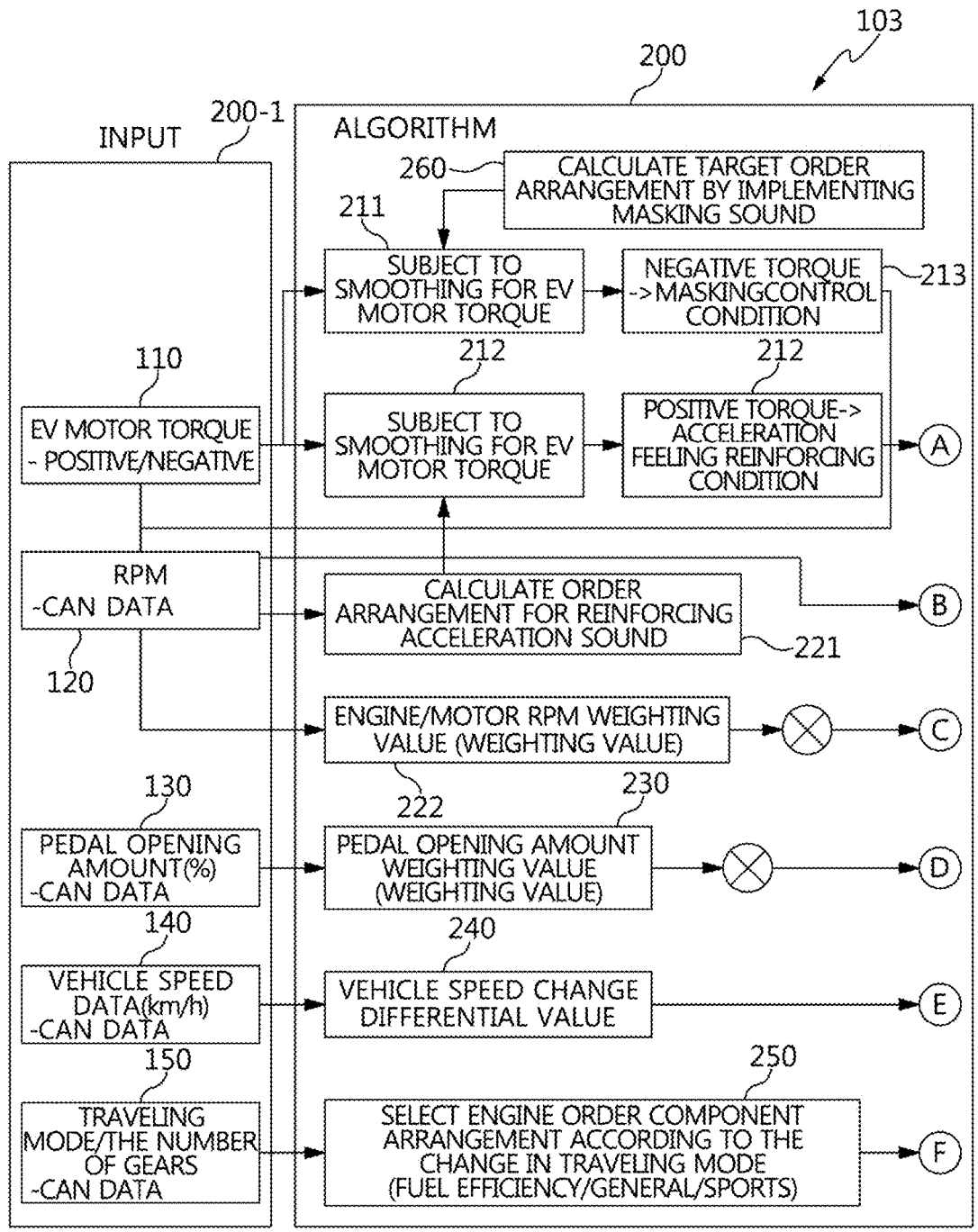
FIG. 3 and FIG. 4 are algorithm diagrams according to the first exemplary embodiment of the present invention.
Figure 4:
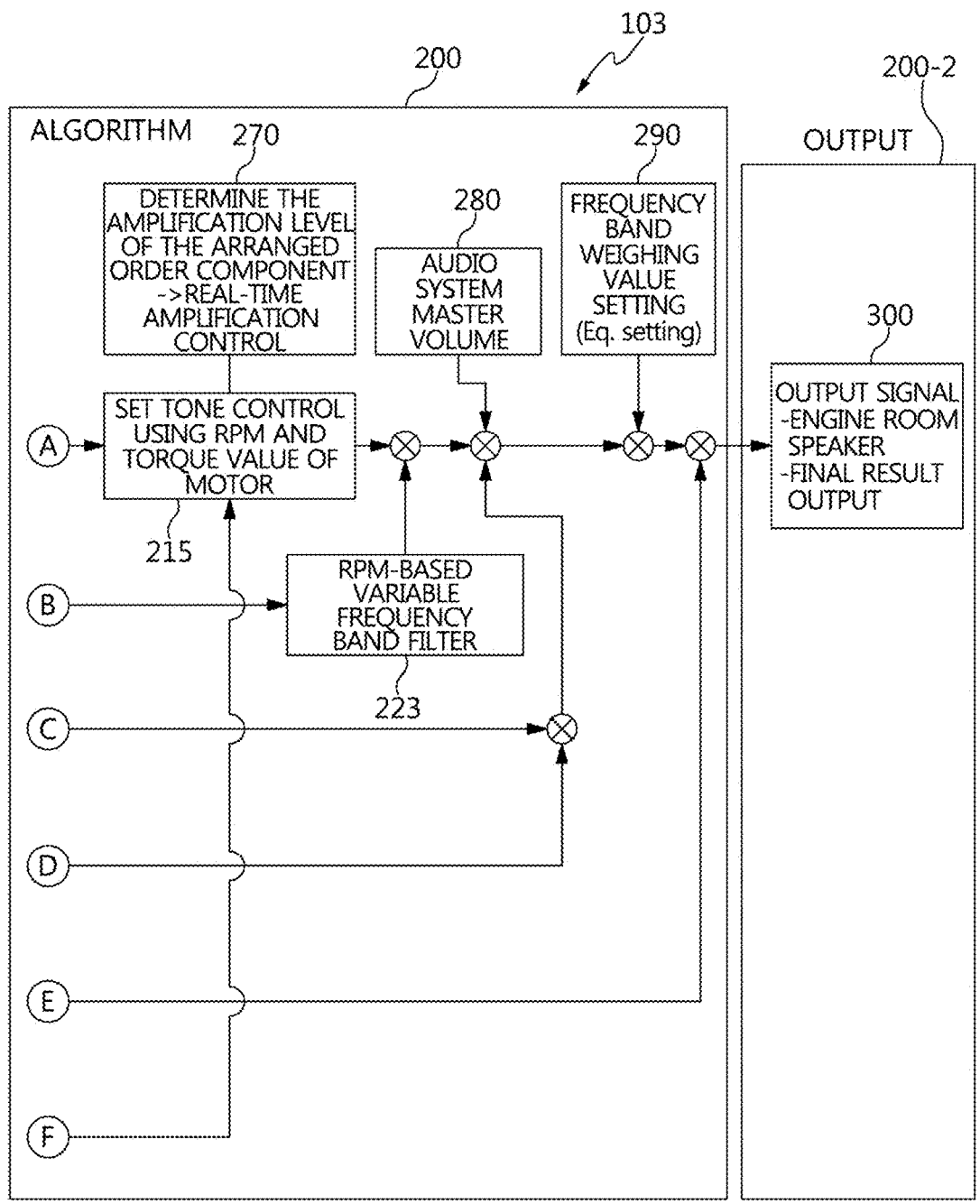

FIG. 3 and FIG. 4 are algorithm diagrams according to the first exemplary embodiment of the present invention.

Referring to FIG. 3 and FIG. 4, the signal processing controller 103 includes an input device 200-1, an algorithm device 200 and an output device 200-2.

The input device 200-1 includes a torque signal unit 110, an RPM unit 120, a pedal opening amount unit 130, a vehicle speed unit 140, a traveling mode and a gear position unit 150.

The algorithm device 200 includes a first torque signal unit 211, a second torque signal unit 212, a torque high-frequency noise masking control unit 213, a torque acceleration feeling reinforcement unit 214, an engine tone control unit 215, an order arrangement unit 221, an RPM weighting value information unit 222, a variable frequency band filter 223, a pedal opening amount weighting value information unit 230, a vehicle speed change differential value unit 240, an order arrangement select unit 250, an order arrangement calculation unit 260, a real time amplification unit 270, an audio system master volume unit 280 and a frequency band weighting value setting unit 290.

The output device 200-2 includes a speaker 300.

The operation of the algorithm according to the first exemplary embodiment of the present invention is as follows.

Referring the input device 200-1, the torque measurement sensor 107 measures the torque signal of the torque signal unit 110 of the motor 101 of the EV vehicle 100 in real time.

The signal processing controller 103 receives the traveling information related to the EV vehicle 100 from the CAN communication in real time.

The traveling information may include the RPM of the RPM unit 120 of the motor 101, the pedal opening amount of the pedal opening amount unit 130, the vehicle speed of the vehicle speed unit 140, the traveling mode and the gear position of the traveling mode and a gear position unit 150.

Referring the algorithm device 200, the torque signal of the torque signal unit 110 of the motor 101 of the EV vehicle 100 includes a first torque signal of the first torque signal unit 211 and a second torque signal of the second torque signal unit 212.

The first torque signal of the first torque signal unit 211 and the second torque signal of the second torque signal unit 212 are subjected to a smoothing procedure, respectively.

The first torque signal of the first torque signal unit 211 corresponds to the torque value when the torque signal 110 of the motor 101 of the EV vehicle 100 is reduced.

At the present time, the order arrangement calculation unit 260 of the signal processing controller 103 determines the engine order arrangement corresponding to the internal combustion engine from the RPM of the motor 101.

Meanwhile, the first torque signal of the first torque signal unit 211 may preferably apply an absolute value to the torque value of the motor 101 through the high-frequency noise masking control of the torque high-frequency noise masking control unit 213.

The second torque signal of the second torque signal unit 212 corresponds to the torque value when the torque signal of the torque signal unit 110 of the motor 101 of the EV vehicle 100 is increased.

An order arrangement of the order arrangement unit 221 for reinforcing the acceleration sound through the RPM of the RPM unit 120 of the CAN communication is used for the second torque signal of the second torque signal unit 212.

The second torque signal of the second torque signal unit 212 is output as the information related to the torque acceleration feeling reinforcement unit 214 for reinforcing the acceleration feeling upon acceleration of the EV vehicle 100 and input to an engine tone control unit of the engine tone control unit 215.

The signal processing controller 103 determines the engine order arrangement of the order arrangement unit 221 corresponding to the internal combustion engine from the RPM of the motor 101.

Meanwhile, the signal processing controller 103 sets the level in the engine order arrangement of the order arrangement unit 221 by use of the RPM of the motor 101.

The signal processing controller 103 performs the engine tone control unit 215 by use of the RPM and the torque value of the motor according to the acceleration condition or the deceleration condition of the motor.

The amplification level among the components of the engine order determined at the instant time is set and amplified in real time by the real time amplification unit 270.

Furthermore, the arrangement of the engine order components according to the change in the traveling mode such as fuel efficiency traveling, general traveling, and sports traveling is selected by the order arrangement select unit 250 through the traveling mode and the gear position information related to the traveling mode and a gear position unit 150 input by the CAN communication, and it is applied to the engine tone control unit 215.

An RPM-based variable frequency of the variable frequency band filter 223 following the engine tone control unit 215 may be applied.

At the present time, the motor RPM of the RPM unit 120 input by the CAN communication may be reflected.

The signal having passed through the variable frequency band filter 223 is input to an audio system master volume unit 280.

At the present time, the audio system master volume unit 280 may receive RPM weighting value information related to the RPM weighting value information unit 222, to which a weighting value is added to the motor RPM of the RPM unit 120 input by the CAN communication.

Furthermore, the audio system master volume unit 280 may receive pedal opening amount weighting value information related to the pedal opening amount weighting value information unit 230 to which a weighting value is added to the pedal opening amount of the pedal opening amount unit 130 input by the CAN communication.

Referring the output device 200-2, the audio system master volume unit 280 transmits a signal to a frequency band weighting value setting unit 290, and the signal to which a weighting value is added by the frequency band weighting value setting unit 290 is finally output as a driving sound through a speaker 300 of the sound output device 102.

At the present time, the information on a vehicle speed change differential value of the vehicle speed change differential value unit 240 of the vehicle speed data of the vehicle speed unit 140 inputted through the CAN communication may be added to the signal output from the frequency band weighting value setting unit 290.

Figure 5:
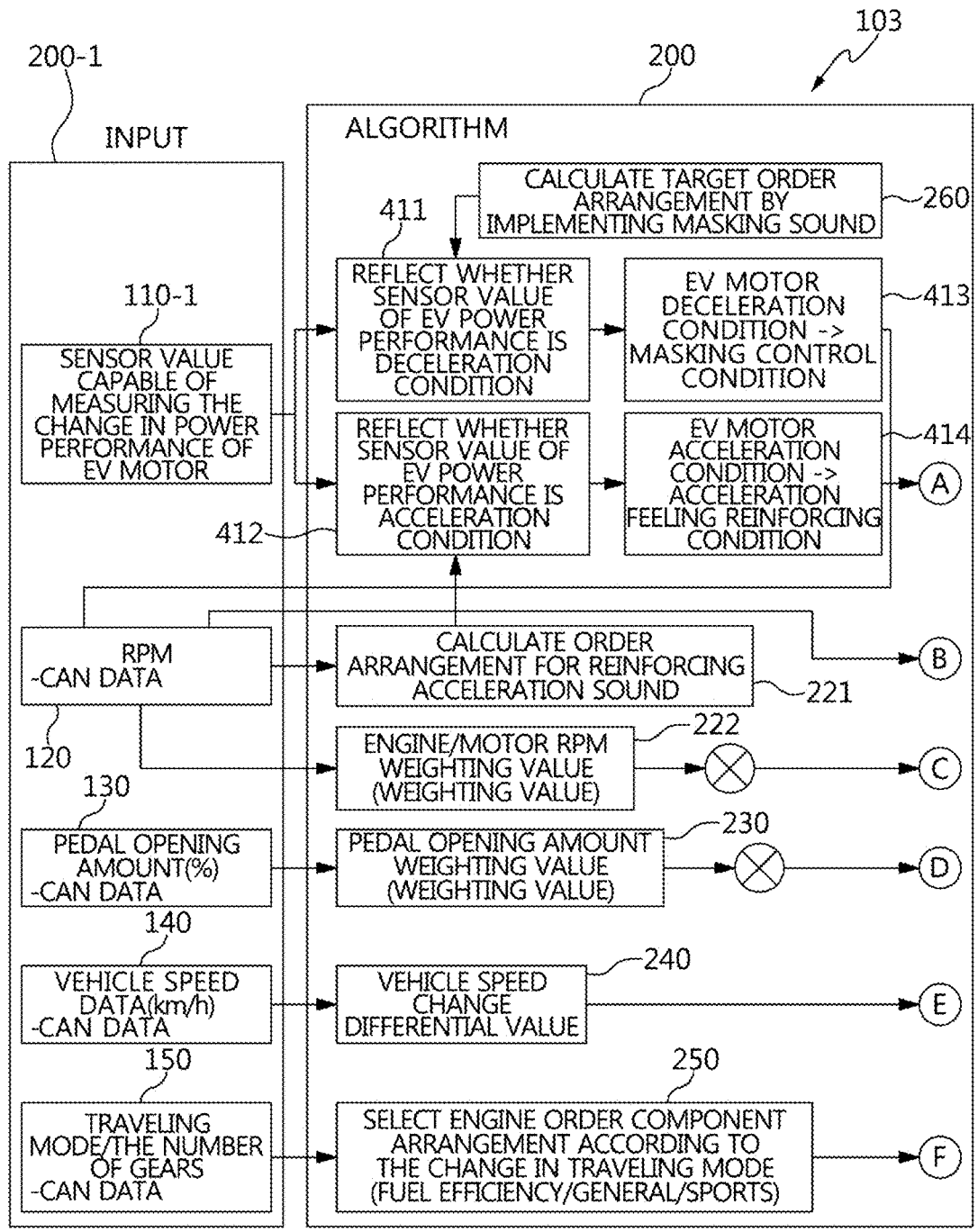
FIG. 5 and FIG. 6 are algorithm diagrams according to a second exemplary embodiment of the present invention.
Figure 6:
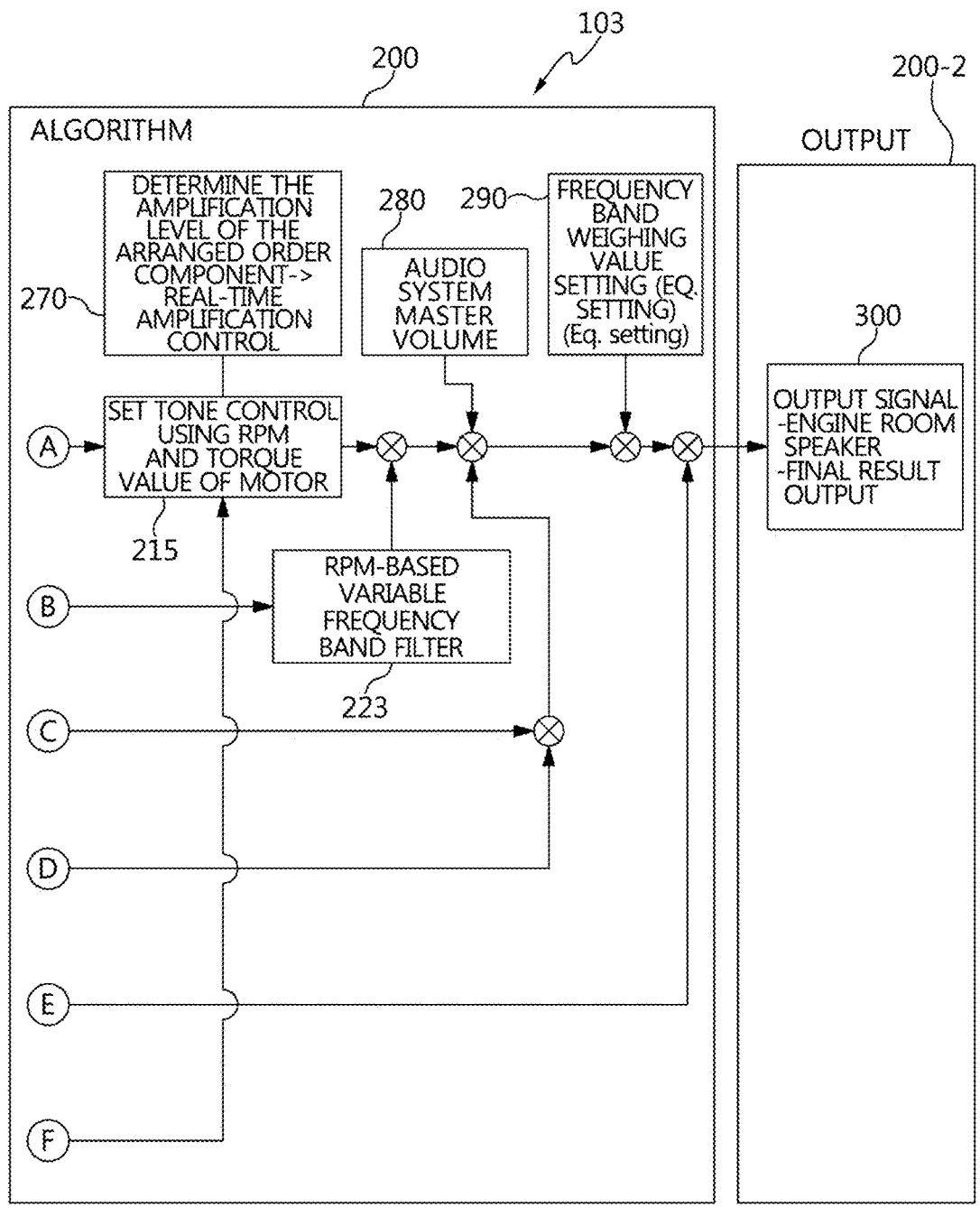

Next, a second exemplary embodiment of the present invention will be described. FIG. 5 and FIG. 6 are algorithm diagrams according to the second exemplary embodiment of the present invention. In the instant case, the signal processing controller 103 includes an input device 200-1, an algorithm device 200 and an output device 200-2.

Referring to FIG. 5, the input device 200-1 of the second exemplary embodiment differs from the input device 200-1 of the first exemplary embodiment of the present invention by use of a power change amount measurement sensor 110-1. For example, the power change amount measurement sensor 110-1 utilizes the sensor value of the acceleration condition having a proportional relation with the motor power change at the time of acceleration and the sensor value of the deceleration condition having the proportional relation with the motor power change at the time of deceleration. Therefore the sensor value of the power change amount measurement sensor 110-1 may be provided in a magnetic sensor of detecting a change in the power of the motor 101 of the EV vehicle 100 as a magnetic flux or various sensors having the same effect.

Referring to FIG. 5 and FIG. 6, unlike the input device 200-1 of the first exemplary embodiment the algorithm device 200 utilizes a first power change signal unit 411 instead of the first torque signal unit 211, a second power change signal unit 412 instead of the second torque signal unit 212, a power high-frequency noise masking control unit 413 instead of the torque high-frequency noise masking control unit 213 and a power acceleration feeling reinforcement unit 414 instead of the torque acceleration feeling reinforcement unit 214.

Referring to FIG. 6, the output device 200-2 of the second exemplary embodiment as the same as the output device 200-2 of the first exemplary embodiment of the present invention by including the speaker 300.

Therefore the second exemplary embodiments is the same as the first exemplary embodiments except that a power change amount measurement sensor is used instead of the torque sensor of the various exemplary embodiments.

The sound output device 102 generates a reinforcing sound to reinforce the driving sound of the EV vehicle 100.

The power change amount measurement sensor 110-1 measures the power change amount signal of the EV vehicle 100 in real time.

The signal processing controller 103 controls the sound output device 102 upon acceleration or deceleration of the EV vehicle 100.

The signal processing controller 103 controls the sound output device 102 by use of the traveling information related to the EV vehicle 100 input in real time from the CAN communication and the signals input from the indoor noise measurement sensor 104 and the power change amount measurement sensor 110-1.

The signal processing controller 103 applies the variable frequency band filter 223 upon acceleration of the EV vehicle 100, and performs the high-frequency noise masking control of the power high-frequency noise masking control unit 413 upon deceleration of the EV vehicle 100.

The traveling information at the instant time may preferably include at least any one among the RPM of the RPM unit 120 of the motor 101, the pedal opening amount of the pedal opening amount unit 130, the vehicle speed of the vehicle speed unit 140, the traveling mode and the gear position of the traveling mode and a gear position unit 150.

The frequency band of the variable frequency band filter 223 may preferably be set in proportion to the RPM of the motor 101 of the EV vehicle 100.

Meanwhile, the high-frequency noise masking control of the power high-frequency noise masking control unit 413 may preferably apply the absolute value to the power change amount value (or the torque value) of the motor 101.

The traveling information may include at least any one among the RPM of the RPM unit 120 of the motor 101, the pedal opening amount of the pedal opening amount unit 130, the vehicle speed of the vehicle speed unit 140, the traveling mode and the gear position of the traveling mode and a gear position unit 150.

At the present time, the indoor noise measurement sensor 104 may preferably detect the indoor noise of the EV vehicle 100.

The signal processing controller 103 may preferably select the engine order arrangement of the order arrangement unit 221 corresponding to the internal combustion engine from the RPM of the motor 101.

The signal processing controller 103 may preferably set the level in the engine order arrangement of the order arrangement unit 221 by use of the RPM of the motor 101.

That is, the signal processing controller 103 may operate any one or more among the torque and the RPM of the motor 101 of the EV vehicle 100, the pedal opening amount, the vehicle speed, the traveling mode, and the gear position.

By use of this, the signal processing controller 103 may preferably apply the variable frequency band filter upon acceleration of the EV vehicle 100, and perform the high-frequency noise masking control of the power high-frequency noise masking control unit 413 upon deceleration of the EV vehicle 100.

At the present time, the indoor noise measurement sensor 104 may preferably detect the indoor noise of the EV vehicle 100.

The frequency band of the variable frequency band filter 223 may preferably be set in proportion to the RPM of the motor 101.

Furthermore, the high-frequency noise masking control of the power high-frequency noise masking control unit 413 may preferably apply the absolute value to the power change amount value (or the torque value) of the motor 101.

The signal processing controller 103 may preferably select the engine order arrangement of the order arrangement unit 221 corresponding to the internal combustion engine from the RPM of the motor 101.

Meanwhile, the signal processing controller 103 may preferably set the level in the engine order arrangement of the order arrangement unit 221 by use of the RPM of the motor 101.

FIG. 5 and FIG. 6 are algorithm diagrams according to the second exemplary embodiment of the present invention.

Referring to the input device 200-1, the power change amount measurement sensor 110-1 measures the power change amount of the motor 101 of the EV vehicle 100 in real time.

The signal processing controller 103 receives the traveling information related to the EV vehicle from the CAN communication in real time.

The traveling information may include the RPM of the RPM unit 120 of the motor 101, the pedal opening amount of the pedal opening amount unit 130, the vehicle speed of the vehicle speed unit 140, the traveling mode 150, and the gear position of the traveling mode and a gear position unit 150, and the like.

Referring the algorithm device 200, the power change amount signal of the power change amount measurement sensor 110-1 of the motor 101 of the EV vehicle 100 includes the first power change signal unit 411 and the second power change signal unit 412.

The first power change value signal of the first power change signal unit 411 and the second power change value signal of the second power change signal unit 412 are subjected to a smoothing procedure, respectively.

The first power change value signal of the first power change signal unit 411 corresponds to the power change value when the power change value signal of the motor 101 of the EV vehicle is reduced.

At the present time, the signal processing controller 103 determines the engine order arrangement of the order arrangement unit 221 corresponding to the internal combustion engine from the RPM of the motor 101.

Meanwhile, the first power change value signal of the first power change signal unit 411 may preferably apply the absolute value to the power change amount value (or the torque value) of the motor 101 through the high-frequency noise masking control of the power high-frequency noise masking control unit 413.

The second power change value signal of the second power change signal unit 412 corresponds to the power change value when the power change value signal of the motor 101 of the EV vehicle 100 is increased.

The order arrangement of the order arrangement unit 221 for reinforcing the accelerating sound through the RPM of the RPM unit 120 of the CAN communication is used for the second power change signal unit 412.

The signal processing controller 103 determines the engine order arrangement of the order arrangement unit 221 corresponding to the internal combustion engine from the RPM of the motor 101.

Meanwhile, the signal processing controller 103 sets the level in the engine order arrangement of the order arrangement unit 221 using the RPM of the motor 101.

The signal processing controller 103 performs the engine tone control unit 215 by use of the RPM and the torque value of the motor according to the acceleration condition or the deceleration condition of the motor.

The amplification level among the components of the engine order determined At the instant time is set and amplified in real time by the real time amplification unit 270.

Furthermore, the arrangement of the engine order components according to the change in the traveling mode such as fuel efficiency traveling, general traveling, and sports traveling is selected by the order arrangement select unit 250 through the traveling mode and the gear position information related to the traveling mode and a gear position unit 150 inputted by the CAN communication, and it is applied to the engine tone control unit 215.

The RPM-based variable frequency of the variable frequency band filter 223 following the engine tone control unit 215 may be applied.

At the present time, the motor RPM of the RPM unit 120 input by the CAN communication may be reflected.

The signal having passed through the variable frequency band filter 223 is input to the audio system master volume unit 280.

At the present time, the audio system master volume unit 280 may receive the RPM weighting value information related to the RPM weighting value information unit 222 to which a weighting value is added to the motor RPM of the RPM unit 120 input by the CAN communication.

Furthermore, the pedal opening amount weighting value information related to the pedal opening amount weighting value information unit 230, to which a weighting value is added to the pedal opening amount of the pedal opening amount unit 130 input by the CAN communication, may be input to the audio system master volume unit 280.

Referring the output device 200-2, the audio system master volume unit 280 transmits a signal to the frequency band weighting value setting unit 290, and the signal to which a weighting value is added by the frequency band weighting value setting unit 290 is finally output as a driving sound through the speaker 300 of the sound output device 102.

At the present time, the information on the vehicle speed change differential value of the vehicle speed change differential value unit 240 of the vehicle speed data of the vehicle speed unit 140 inputted through the CAN communication may be added to the signal output from the frequency band weighting value setting unit 290.

Figure 7A:
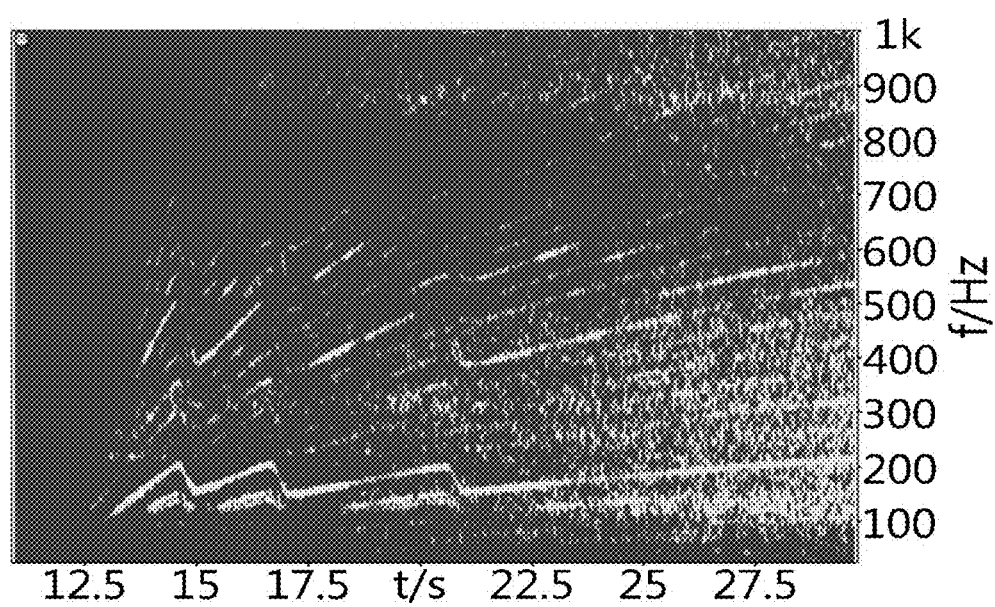
FIG. 7A is a graph before an engine tone control upon acceleration of the EV vehicle according to the first exemplary embodiment of the present invention.
Figure 7B:
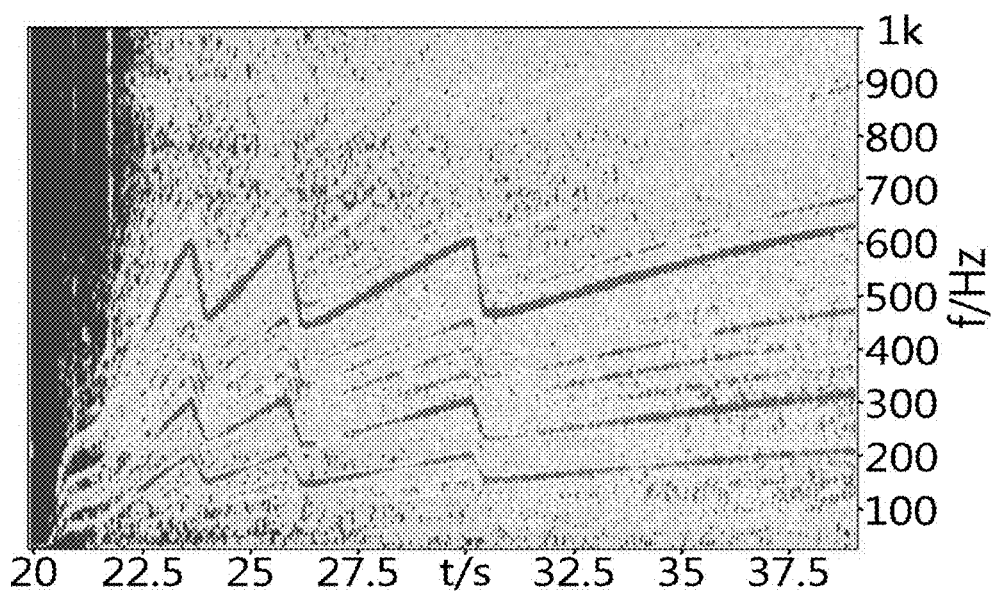
FIG. 7B is a graph to which the engine tone control is applied upon acceleration of the EV vehicle according to the first exemplary embodiment of the present invention.
Figure 7C:
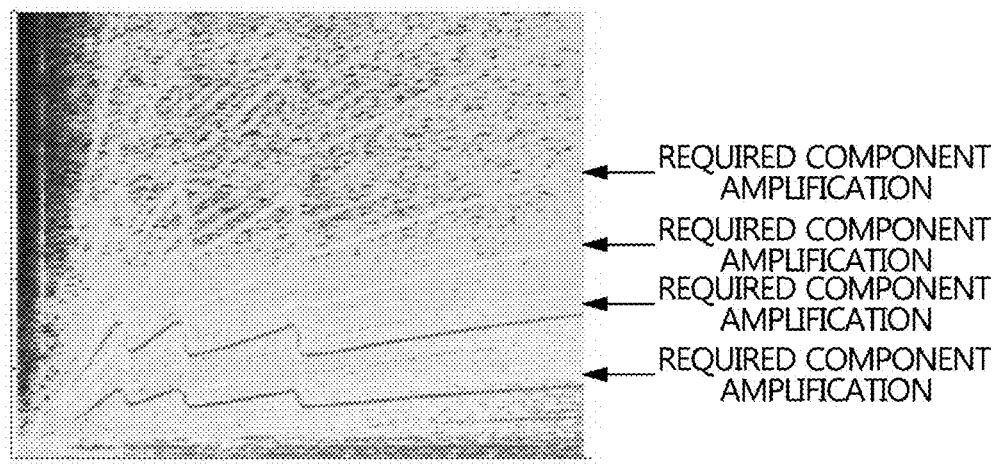
FIG. 7C is a graph of the final engine tone through a microphone upon acceleration of the EV vehicle according to the first exemplary embodiment of the present invention.

FIG. 7A is a graph before an engine tone control upon acceleration of the EV vehicle 100 according to the first exemplary embodiment of the present invention, FIG. 7B is a graph to which the engine tone control is applied upon acceleration of the EV vehicle 100 according to the first exemplary embodiment of the present invention, and FIG. 7C is a graph of the final engine tone through a microphone upon acceleration of the EV vehicle 100 according to the first exemplary embodiment of the present invention.

The result in which only tone of the necessary component has been amplified is showed by applying the arrangement of the order component set for reinforcing the acceleration feeling upon acceleration of the EV vehicle 100 and the level based on the motor torque.

This is the result of applying the variable frequency band filter proportional to the RPM of the motor.

As a result, it is possible to confirm that the natural tone control of the engine may be performed.

Meanwhile, it is possible to perform the PID control of the PID controller 105 through the indoor noise measurement sensor 104 installed in the EV vehicle 100, confirming the result in which only the necessary component has been amplified.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electric vehicle driving sound control system, comprising:
   a sound output device of generating a driving sound of an electric vehicle (EV);
   a torque measurement sensor of measuring a torque of a motor in the EV;
   an indoor noise measurement sensor mounted in an indoor of the EV and detecting an indoor noise of the EV; and
   an outdoor noise measurement sensor mounted in an outdoor of the EV and detecting an outdoor noise of the EV; and
   a signal processing controller configured for controlling the sound output device to reach a target tone by receiving signals from the torque measurement sensor and the indoor noise measurement sensor,
   wherein the signal processing controller is configured to extract and to output an acceleration feeling sound component from an engine sound when a power performance of an engine vehicle matching with a power performance of the EV is implemented upon acceleration of the EV, and to mask high-frequency noise upon deceleration of the EV by the sound output device, by use of traveling information related to the EV inputted from CAN communication in a real time and the signals inputted from the indoor noise measurement sensor and the torque measurement sensor, wherein the signal processing controller is configured to match and output an acceleration sound corresponding to a general internal combustion engine upon the acceleration of the EV vehicle, wherein the acceleration feeling sound component is extracted from an engine order arrangement arranged based on revolutions per minute (RPM) of the motor, wherein the acceleration feeling sound component applies a variable bandwidth filter which is proportional to the RPM of the motor, wherein the acceleration feeling sound component to which the variable bandwidth filter is applied has an indoor tone subject to a proportional-integral-differential (PID) control by the indoor noise measurement sensor or by the outdoor noise measurement sensor.

2. The EV driving sound control system of claim 1, wherein whether the EV is accelerated is determined by whether a change in the torque of the motor is determined as positive from the torque measurement sensor.

3. The EV driving sound control system of claim 1, wherein the torque of the motor is subject to smoothing in real time, and wherein the outdoor is an engine compartment of the EV.

4. The EV driving sound control system of claim 1, wherein the acceleration feeling sound component is provided through an indoor speaker.

5. The EV driving sound control system of claim 1, wherein whether the EV is decelerated is determined by whether a change in the torque of the motor is determined as negative from the torque measurement sensor, and wherein the torque of the motor is subject to smoothing in real time.

6. The EV driving sound control system of claim 1, wherein the masking the high-frequency noise extracts a component required for masking upon the deceleration of the EV from the RPM of the motor and a negative torque of the motor.

7. The EV driving sound control system of claim 6, wherein the component required for masking is an order arrangement from the RPM of the motor and a level of the torque in the motor, and wherein the level of the torque of the motor is converted into positive by applying an absolute value to a negative torque value.

8. An electric vehicle driving sound control system, comprising:
    a sound output device of generating a reinforcing sound in order to reinforce a driving sound of an electric vehicle (EV);
    a power change amount measurement sensor of measuring a power change signal of the EV in real time;
    an indoor noise measurement sensor mounted in an indoor of the EV and detecting an indoor noise of the EV; and
    a signal processing controller configured for controlling the sound output device by applying a variable frequency band filter upon acceleration of the EV, and performing a high-frequency noise masking control upon deceleration of the EV, by use of traveling information related to the EV inputted from CAN communication in a real time and signals inputted from an indoor noise measurement sensor and the power change amount measurement sensor,
    wherein the signal processing controller is configured to match and output an acceleration sound corresponding to a general internal combustion engine upon the acceleration of the EV,
    wherein the acceleration feeling sound component is extracted from an engine order arrangement arranged based on revolutions per minute (RPM) of the motor,
    wherein the acceleration feeling sound component applies a variable bandwidth filter which is proportional to the RPM of the motor,
    wherein the acceleration feeling sound component to which the variable bandwidth filter is applied has an indoor tone subject to a proportional-integral-differential (PID) control by the indoor noise measurement sensor.

9. The EV driving sound control system of claim 8, wherein the traveling information includes at least one among the RPM of the motor, a pedal opening amount, a vehicle speed, a traveling mode, and a gear position.

10. The EV driving sound control system of claim 8, wherein the signal processing controller is configured to select the engine order arrangement corresponding to an engine from the RPM of the motor, and wherein the signal processing controller is configured to set a level in the engine order arrangement by use of the RPM of the motor.

11. An electric vehicle driving sound control method, comprising:
    applying, by a signal processing controller, a variable frequency band filter upon acceleration of an electric vehicle (EV); and
    performing, by the signal processing controller, a high-frequency noise masking control upon deceleration of the EV by operating one or more among a torque and revolutions per minute (RPM) of a motor of the EV, a pedal opening amount, a vehicle speed, a traveling mode, and a gear position in the signal processing controller,
    wherein the signal processing controller is configured to match and output an acceleration sound corresponding to a general internal combustion engine upon the acceleration of the EV vehicle,
    wherein an acceleration feeling sound component is extracted from an engine order arrangement arranged based on the revolutions per minute (RPM) of the motor,
    wherein the acceleration feeling sound component applies a variable bandwidth filter which is proportional to the RPM of the motor,
    wherein the acceleration feeling sound component to which the variable bandwidth filter is applied has an indoor tone subject to a proportional-integral-differential (PID) control by an indoor noise measurement sensor or by an outdoor noise measurement sensor.

12. The EV driving sound control method of claim 11, wherein the indoor noise measurement sensor is configured to detect an indoor noise of the EV vehicle.

13. The EV driving sound control method of claim 11, wherein a frequency band of the variable frequency band filter is set in proportion to the RPM of the motor, and wherein a high-frequency noise masking control applies an absolute value to a torque value of the motor.

14. The EV driving sound control method of claim 11, wherein the signal processing controller is configured to select the engine order arrangement corresponding to an engine from the RPM of the motor, and wherein the signal processing controller is configured to set a level in the engine order arrangement by use of the RPM of the motor.

15. The EV driving sound control method of claim 11, further including applying the variable frequency band filter upon the acceleration of the EV and performing the high-frequency noise masking control upon the deceleration of the EV by operating one or more among a real-time power change amount of the EV, the RPM of the motor, the pedal opening amount, the vehicle speed, the traveling mode, and the gear position in the signal processing controller.

16. The EV driving sound control method of claim 11, wherein the vehicle speed is applied to differential control logic upon constant-speed traveling of the EV.

* * * * *